(12) United States Patent
Gharib

(10) Patent No.: US 10,407,992 B2
(45) Date of Patent: Sep. 10, 2019

(54) DIRECTIONAL DRILLING SYSTEMS, APPARATUS, AND METHODS

(71) Applicant: Halliburton Energy Services, Inc., Houston, TX (US)

(72) Inventor: Hossam Gharib, Edmonton (CA)

(73) Assignee: Halliburton Energy Services, Inc., Houston, TX (US)

( * ) Notice: Subject to any disclaimer, the term of this patent is extended or adjusted under 35 U.S.C. 154(b) by 206 days.

(21) Appl. No.: 15/513,386

(22) PCT Filed: Dec. 17, 2014

(86) PCT No.: PCT/US2014/070780
§ 371 (c)(1),
(2) Date: Mar. 22, 2017

(87) PCT Pub. No.: WO2016/099473
PCT Pub. Date: Jun. 23, 2016

(65) Prior Publication Data
US 2017/0247948 A1  Aug. 31, 2017

(51) Int. Cl.
*E21B 7/04* (2006.01)
*E21B 7/06* (2006.01)
*E21B 36/00* (2006.01)
*E21B 36/04* (2006.01)
*F03G 7/06* (2006.01)

(52) U.S. Cl.
CPC .............. *E21B 7/062* (2013.01); *E21B 7/067* (2013.01); *E21B 36/001* (2013.01); *E21B 36/04* (2013.01); *F03G 7/065* (2013.01)

(58) Field of Classification Search
CPC ............. E21B 7/067; E21B 7/062; E21B 7/04
See application file for complete search history.

(56) References Cited

U.S. PATENT DOCUMENTS

| 5,199,497 | A  |   | 4/1993 | Ross |                      |
|-----------|----|---|--------|------|----------------------|
| 6,114,851 | A  | * | 9/2000 | Kruspe | G01V 3/32 324/303 |
| 6,216,779 | B1 |   | 4/2001 | Reinhardt |                  |
| 6,218,833 | B1 | * | 4/2001 | Kruspe | G01V 3/32 324/303 |
| 7,360,610 | B2 | * | 4/2008 | Hall   | E21B 7/064 175/385 |

(Continued)

OTHER PUBLICATIONS

International Search Report and Written Opinion issued in corresponding application No. PCT/US2014/070780 dated Sep. 1, 2015, 15 pgs.

(Continued)

*Primary Examiner* — Catherine Loikith
(74) *Attorney, Agent, or Firm* — Chamberlain Hrdlicka

(57) ABSTRACT

A directional drilling system comprises a driveshaft to couple to a drill string or a drill bit and an apparatus. The apparatus comprises an eccentric coupler disposed at the driveshaft and a coil coupled at one end to the eccentric coupler. In some embodiments, the coil comprises a fixed end and a rotating end. In response to a first transition temperature, the rotating end of the coil causes the eccentric coupler to rotate about the driveshaft, so as to move the driveshaft from a first orientation to a second orientation. Additional apparatus, methods, and systems are disclosed.

19 Claims, 5 Drawing Sheets

(56) References Cited

U.S. PATENT DOCUMENTS

| | | |
|---|---|---|
| 7,506,701 B2 | 3/2009 | Hall et al. |
| 7,624,797 B2 | 12/2009 | Fay |
| 8,087,479 B2 | 1/2012 | Kulkarni et al. |
| 8,104,548 B2 | 1/2012 | Ma et al. |
| 8,640,779 B2 | 2/2014 | Young et al. |
| 2008/0179098 A1 | 7/2008 | Hall et al. |
| 2010/0078173 A1 | 4/2010 | Buytaert et al. |
| 2010/0108382 A1 | 5/2010 | Ma et al. |
| 2013/0319764 A1 | 12/2013 | Schaaf et al. |

OTHER PUBLICATIONS

M. L. A. S. M. G. Jaronie Mohd Janie, "A Review of Shape Memory Alloy Research, applications and opportunities," Material Design, vol. 56, pp. 1078-1113, 2014.

* cited by examiner

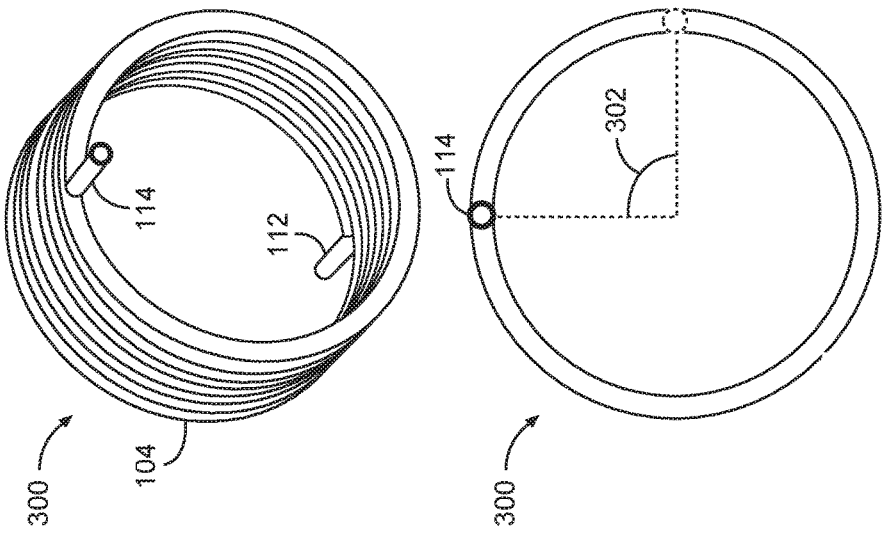
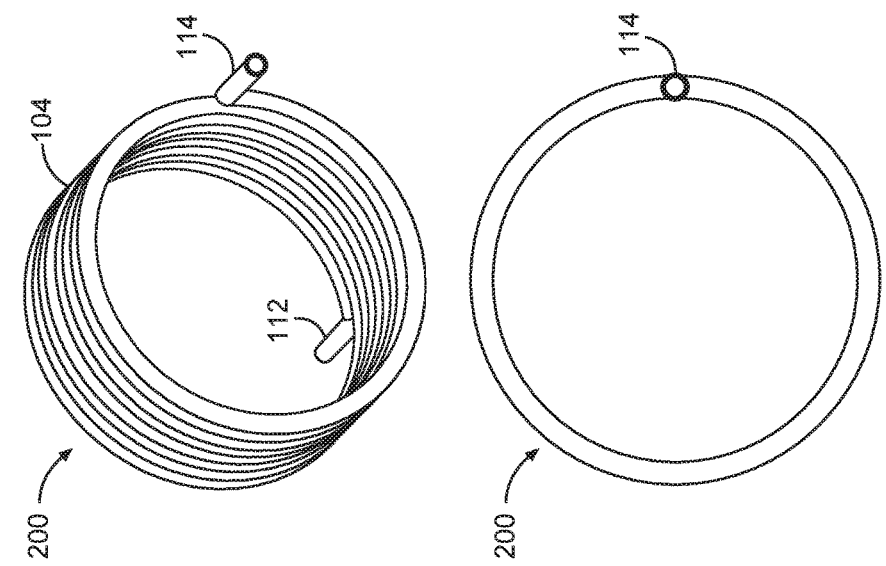

DIRECTIONAL DRILLING SYSTEMS, APPARATUS, AND METHODS

BACKGROUND

In directional drilling, the direction of the drill bit can be controlled through a bottom hole assembly (BHA) that orients the driveshaft through an external bend to the BHA housing, an internal bend, or tilting the driveshaft. The internal bend and tilting the driveshaft can provide better hole quality than the external housing bend. Conventionally, the actuation mechanism that bends or tilts the shaft uses electric motors or hydraulics, which have many components and thus, issues with reliability.

BRIEF DESCRIPTION OF THE DRAWINGS

The present disclosure may be better understood, and its numerous features and advantages made apparent to those of ordinary skill in the art by referencing the accompanying drawings. The use of the same reference symbols in different drawings indicates similar or identical items.

FIGS. 2A and 2B depict the coil of FIG. 1 in a first state, in accordance with some embodiments.

FIGS. 3A and 3B depict the coil of FIGS. 1, 2A, and 2B in a second state, in accordance with some embodiments.

DETAILED DESCRIPTION

FIGS. 1-7 illustrate example apparatus, systems, and methods for improved directional drilling. In some embodiments, an eccentric coupler influences a driveshaft coupled to a drill string or a drill bit. A coil forms part of the eccentric coupler assembly, and comprises shape memory alloy wire, or similar material, including a fixed end and a rotating end. The rotating end couples to, or otherwise interacts with, the eccentric coupler. In response to a first transition temperature, the coil elongates, rotating the eccentric coupler about the driveshaft, so as to bend, tilt, or otherwise move the driveshaft from a first orientation to a second orientation. Other embodiments provide additional functionality. The directional drilling system can be used in combination with a rotary steerable system (RSS) or mud motors, and in other directional drilling applications.

Figure 1:
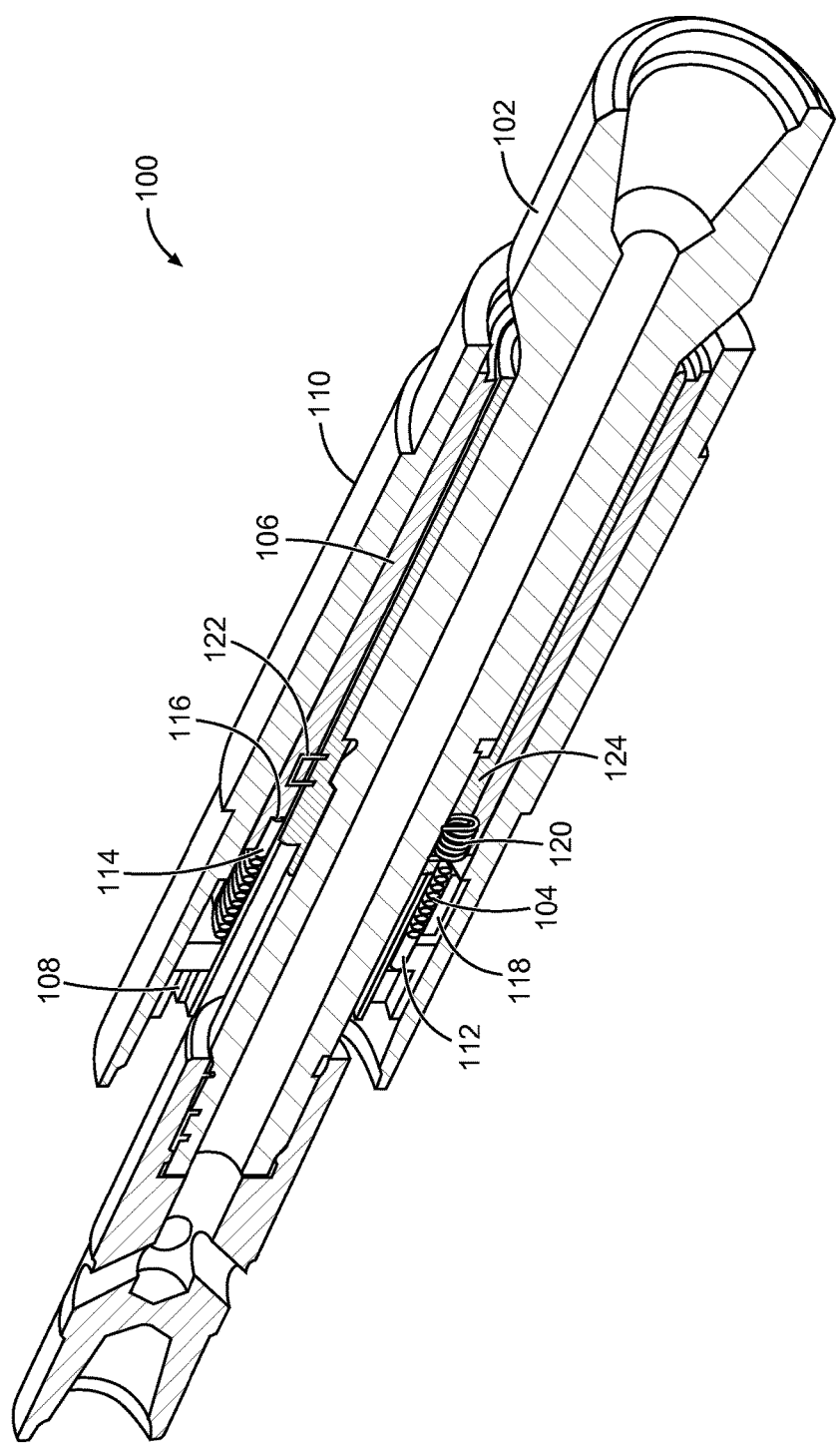
FIG. 1 depicts a cross-section view of a directional drilling system, in accordance with some embodiments.

FIG. 1 depicts a cross-section view of a directional drilling system 100, in accordance with some embodiments. In the illustrated embodiment, the directional drilling system 100 comprises a driveshaft 102, a coil 104, an eccentric coupler 106, and electronics 108. In at least one embodiment, a housing 110 houses one or more of the coil 104, the eccentric coupler 106, and the electronics 108. In some embodiments, the driveshaft 102 is to couple to a drill string or a drill bit.

The coil 104 comprises shape memory alloy wire, or similar material, such that the coil 104 changes one or more properties responsive to the application of a transition temperature. For example, in at least one embodiment, the wire of the coil 104 elongates in response to the transition temperature. In some embodiments, the coil 104 comprises a plurality of zones of shape memory alloy, such that the shape memory alloy wire of each zone of the plurality of zones comprises different properties or responds to different parameters, for example, different transitional temperatures. In at least one embodiment, the coil 104 comprises two-way memory alloy wire, such that the wire of the coil 104 elongates in response to a warmer transition temperature and contracts in response to a cooler transition temperature.

In the illustrated embodiment, the coil 104 comprises a fixed end 112 and a rotating end 114. In some embodiments, the fixed end 112 is coupled to the housing 110 directly or indirectly. In at least one embodiment, a direct coupling is through a structural element integral with the housing 110, such as an internal shoulder or material offset. In at least one embodiment, an indirect coupling is through an interfacial element that transmits load from the coil 104 to the housing 110 like a sleeve, ring, or cylinder, which is threaded, interference fitted, or locked to the housing 110. The rotating end 114 of the coil 104 interacts with the eccentric coupler 106, such that as the rotating end 114 rotates, the eccentric coupler 106 is urged into rotation. For example, in at least one embodiment, the rotating end 114 of the coil 104 is coupled to the eccentric coupler 106. In some embodiments, the eccentric coupler 106 comprises a slot 116 to receive the rotating end of the coil 104. In at least one embodiment, the eccentric coupler 106 acts as a stationary part of a radial bearing, such that during drilling operations, the driveshaft 102 rotates inside the eccentric coupler 106. For example, in at least one embodiment, the driveshaft 102 rotates inside the eccentric coupler 106 via an intermediate sleeve 124 fixed to the driveshaft 102.

In some embodiments, the electronics 108 operate to apply a current to heat the coil 104, so as to elongate the wire forming the coil 104 in response to the transition temperature. The transition temperature causes the wire of the coil 104 to elongate, rotating the rotating end 114, and therefore the eccentric coupler 106.

In many embodiments, the eccentric coupler 106 is disposed around the driveshaft 102. In at least one embodiment, the eccentric coupler 106 comprises a cylinder. In some embodiments, the eccentric coupler 106 comprises an inside axis aligned with an axis of the driveshaft 102 and an outside axis that is nonparallel to the driveshaft 102. In at least one embodiment, the outside axis of the eccentric coupler 106 is aligned with an axis of a tool of a drillstring. As the eccentric coupler 106 rotates, it translates the rotational movement into lateral movement of the ends of the driveshaft 102 as a result of the angular offset between the inner axis and the outer axis. In at least one embodiment, the dimensions of the eccentric coupler 106 are chosen according to the desired orientation of the driveshaft 102 with respect to a selected amount of coil heating/cooling.

The shape memory alloy coil 104 serves as an actuator to rotate the eccentric coupler 106 and move the driveshaft 102 to a different orientation. Shape memory alloys react directly to environmental stimuli and possess fewer components compared to electrical and hydraulic mechanisms. Further, shape memory alloys can provide higher work density compared to conventional mechanisms (e.g., shape memory alloys can provide twenty-five times greater work density than electric motors).

In some embodiments, the coil 104 comprises a plurality of zones. Each of the plurality of zones of the coil 104 may comprise different parameters or characteristics. For example, in at least one embodiment, each of the plurality of zones responds to a different one of a plurality of transition temperatures, such that each of the plurality of transition temperatures corresponds to one of a plurality of orientations of the driveshaft.

The coil 104 may comprise any high-strength material (e.g., a material comprising a yield strength of at least 70,000 psi) capable of changing shape upon heat actuation, or cooling, for example, Ni—Ti, Cu—Zn—Al SMA wire, ferrous polycrystalline SMA wire, or the like. The shape memory alloy may be chosen for the coil 104 based on characteristics that will affect the reaction of the coil 104 to the transition temperature, and therefore the orientation of the driveshaft. For example, in at least one embodiment, the coil 104 comprises shape memory alloy that has a transition temperature that is higher than an expected downhole temperature to which the coil will be exposed. For example, in at least one embodiment, the transition temperature of the coil 104 is set above 250° C. In some embodiments, the diameter of the wire of the coil 104 is chosen based on the desired torque to rotate the eccentric coupler 106. For example, in at least one embodiment, the coil 104 comprises a 0.3-inch diameter shape memory alloy wire, which produces about 250 ft-lb torque output to rotate an eccentric cylinder for a hole having a diameter of eight and half inches. In some embodiments, the number of revolutions of wire in the coil 104 is chosen based on the desired angular rotation. For example, in at least one embodiment, the coil 104 comprises 8.5 revolutions to achieve a 90° angular rotation at 3% strain.

In some embodiments, the electronics 108 apply a current to heat the coil 104, so as to elongate the wire forming the coil 104, rotating the eccentric coupler 106, and moving the driveshaft 102 from a first orientation to a second orientation. In at least one embodiment, a cooling element 118 (which may comprise a Peltier cooler) applies cooling to the coil 104, causing the wire forming the coil 104 to contract, the eccentric coupler 106 to rotate in the opposite direction, and the driveshaft 102 to return from the second orientation to the first orientation. In some embodiments, driveshaft 104 returns to the first orientation in response to withdrawal of the transition temperature. In some embodiments, the electronics 108 apply a first current to heat the coil 104 to a first transition temperature, and apply a second current to heat the coil 104 to a second transition temperature.

In some embodiments, the system 100 comprises a torsion spring 120, or similar mechanism, to return the driveshaft 102 to the first orientation, from the second orientation in response to withdrawal of the transition temperature. In some embodiments, the system 100 comprises at least one locking element 122 to lock the driveshaft 102 in an orientation achieved by elongation or contraction of the coil 104. For example, in at least one embodiment, the coil 104 causes the driveshaft 102 to move from a first orientation to a second orientation in response to a transition temperature, and the locking element 122 is actuated to lock the driveshaft 102 in the second orientation, such that the locking element 122 maintains the driveshaft 102 in the second orientation when the transition temperature has been withdrawn. In some embodiments, the locking element 122 is actuated by at least one of: a bit load application (i.e., applying a load to the bit), a drill string rotation, or a mud pressure differential.

FIGS. 2A and 2B depict an example of the coil 104 of FIG. 1, in a first state 200, and FIGS. 3A and 3B depict the coil 104 in a second state 300, in accordance with some embodiments. In the illustrated embodiment of FIGS. 2A and 2B, the electronics 108 have not yet supplied the current to effect a transition temperature in the coil 104. In some embodiments, the position and orientation of the fixed end 112 or the rotating end 114 may differ from the illustrated embodiments. Further, some embodiments may comprise less or more revolutions of the wire of the coil 104.

When the electronics 108 apply the transition temperature to the coil 104, the wire of the coil 104 transforms. For example, in at least one embodiment, the wire of the coil 104 deforms in the radial direction through the reduction or increase in its diameter to retain its shape based on its temperature point. In some embodiments, the wire of the coil 104 elongates, such that the rotating end 114 rotates about the longitudinal axis of the coil 104 from the first state 200 shown in FIGS. 2A and 2B, to the second state 300 shown in FIGS. 3A and 3B. The wire for the coil 104 may be chosen and oriented so as to achieve a particular angle of rotation 302. For example, in the illustrated embodiment, the angular rotation 302 of the rotating end 114 of the coil 104 between the first state 200 and the second state 300 is about 90°. At the second state 302, the rotating end 114 has caused the eccentric coupler 106 to rotate about the driveshaft 102, moving the driveshaft 102 from a first orientation to a second orientation.

Figure 4:
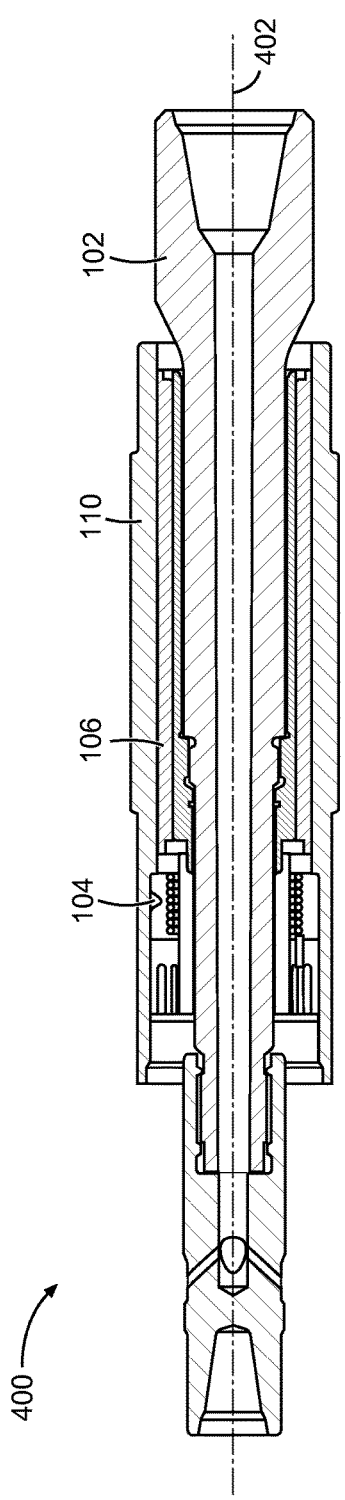
FIG. 4 depicts the directional drilling system of FIG. 1 in a first orientation, in accordance with some embodiments.
Figure 5:
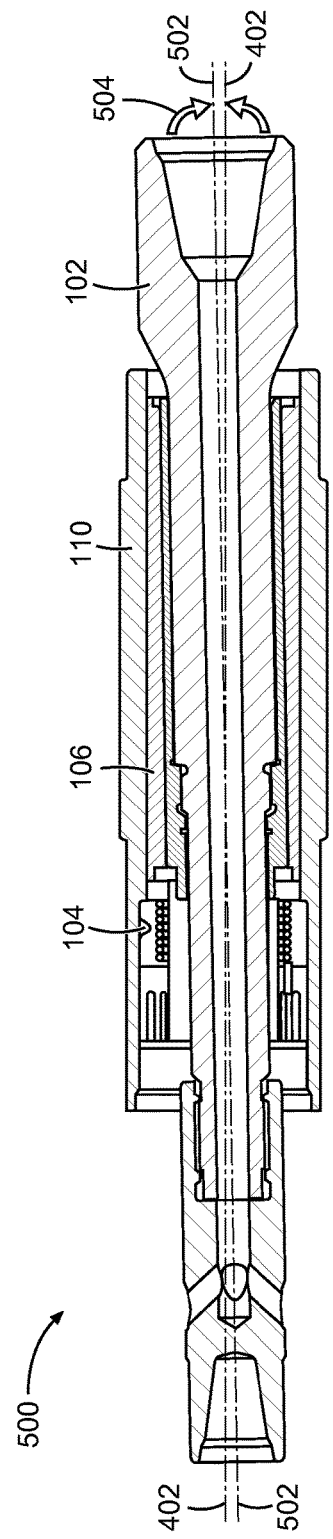
FIG. 5 depicts the directional drilling system of FIGS. 1 and 4 in a second orientation, in accordance with some embodiments.

FIG. 4 depicts the directional drilling system 100 of FIG. 1 in a first orientation 400, and FIG. 5 depicts the directional drilling system 100 in a second orientation 500, in accordance with some embodiments. In the illustrated embodiment of FIG. 4, the electronics 108 have not yet applied a current to induce the transition temperature in the coil 104, and the first orientation 400 comprises an axis 402 of the driveshaft 102. At the second state 302 (reached after the electronics 108 supply a current to the coil 104), the rotating end 114 of the coil 104 has caused the eccentric coupler 106 to rotate about the driveshaft 102, moving the driveshaft 102 from the first orientation 400 to the second orientation 500 comprising an axis 502. The angle 504 of the tilt of the driveshaft 102 between orientation 400 comprising axis 402 and orientation 500 comprising axis 502 may vary depending on the characteristics of components of the directional drilling system 100 in various embodiments. For example, in some embodiments, the wire of the coil 104, the dimensions of the eccentric coupler 106, or the dimensions of the driveshaft 102 affect the angle 504 and direction of movement of the driveshaft 102. In some embodiments, the angular rotation 302 (see FIGS. 3A and 3B) of the rotating end 114 of the coil 104 affects the angle 504 of the driveshaft 102 between the first and second orientations 400, 500. In some embodiments, a locking mechanism 122 locks the driveshaft 102 in the first orientation 400, the second orientation 500, other orientation, or a combination of these. In at least one embodiment, the directional drilling system 100 operates to move the driveshaft 102 between more than two orientations. In some embodiments, the directional drilling system 100 operates to return the driveshaft 102 to the first orientation 400, from the second orientation 500, for example, via the use of a second transition temperature, a torsion spring, a combination of these, or the like.

Figure 6:
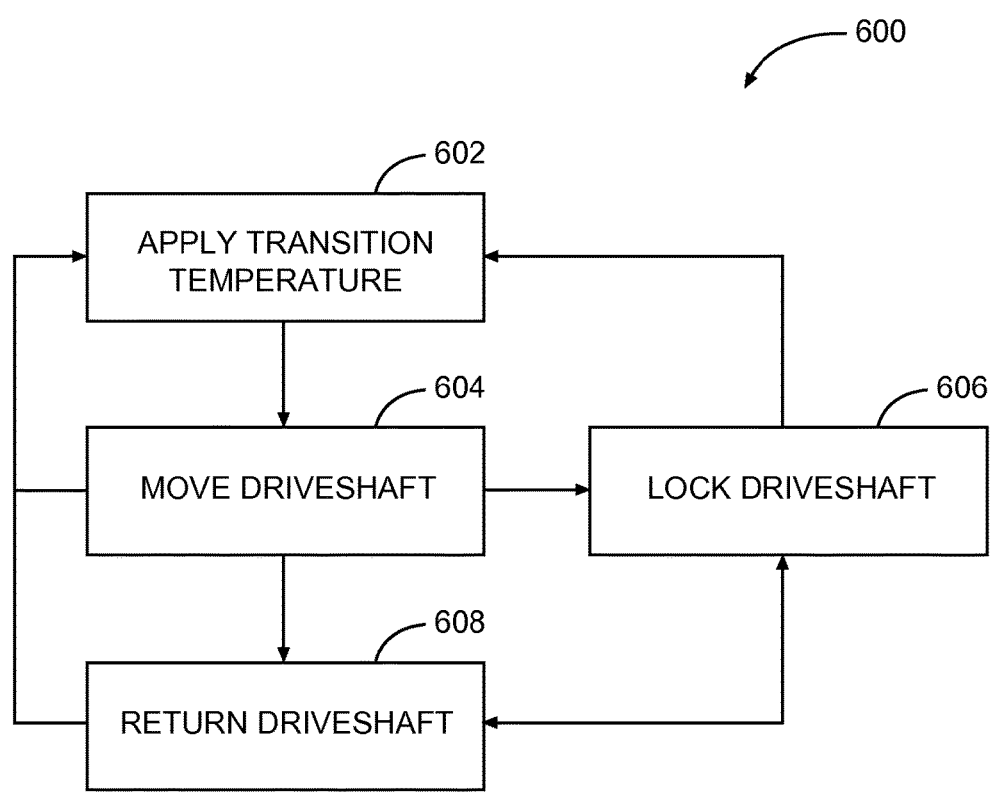
FIG. 6 is a flow diagram of an example method of directional drilling, in accordance with some embodiments.

FIG. 6 is a flow diagram of an example method 600 of directional drilling, in accordance with some embodiments. As a matter of convenience, the method 600 is described with reference to the directional drilling system 100 of FIGS. 1-5. At block 602, the electronics 108 operate to apply a transition temperature via an electrical current to the coil 104. The transition temperature may comprise any temperature appropriate to the material makeup and mechanical construction selected for manufacture of the coil 104. In at least one embodiment, the transition temperature is a temperature greater than an anticipated maximum downhole temperature, such that the coil 104 will not be actuated by the downhole temperature. The transition temperature causes the wire of the coil 104 to elongate or contract, such that it rotates the eccentric coupler 106 about the driveshaft 102.

At block 604, the coil 104, via the eccentric coupler 106, moves the driveshaft 102 from a first orientation 400 to a second orientation 500. In some embodiments, the eccentric coupler 106 is disposed about the driveshaft 102, such that it translates the rotational movement from the coil 104 to lateral movement of the driveshaft 102. In some embodiments, the orientation 500 is predetermined, such that components of the directional drilling system 100 are chosen to achieve the predetermined orientation 500. For example, in at least one embodiment, the angle 504 of the tilt is chosen in advance according to the desired drilling direction. In at least one embodiment, the method 600 returns to block 602, whereby the electronics 108 apply a transition temperature to the coil 104, which may be the same transition temperature, or may be a different transition temperature. In at least one embodiment, the electronics 108 apply different temperatures to the coil 104 to actuate different zones of the coil 104.

In at least one embodiment, after the coil 104 has moved the driveshaft 102 at block 604, the method 600 proceeds to block 606, whereby a locking mechanism 122 locks the driveshaft 102 in a selected orientation. For example, in at least one embodiment, the locking mechanism 122 locks the driveshaft 102 in orientation 500 until orientation 500 is no longer desirable. In at least one embodiment, when a different orientation is desirable, the locking mechanism 122 releases the driveshaft 102, and the method 600 returns to block 602, whereby the electronics 108 apply a transition temperature to move the driveshaft 102 to a new orientation.

In at least one embodiment, after the driveshaft 102 is moved to the orientation 500 at block 604, or after the driveshaft 102 is locked in the second orientation 500 at block 606, the method 600 proceeds to block 608.

At block 608, the directional drilling system 100 returns the driveshaft 102 to a previous orientation. For example, in at least one embodiment, the directional drilling system 100 returns the driveshaft 102 to the first orientation 400 from the second orientation 500. In at least one embodiment, a cooling element 118 cools the coil 104 to return the driveshaft 102 to a previous orientation. In some embodiments, the electronics 108 withdraw the current from the coil 104, effectively applying a transition temperature to the coil, to return the driveshaft 102 to a previous orientation. In at least one embodiment, a torsion spring 120 returns the driveshaft 102 to a previous orientation. From block 608, the directional drilling system 100 may lock the driveshaft 102 in its current orientation at block 606, or apply a transition temperature to move the driveshaft 102 to a different orientation at blocks 602 and 604, and the method 600 may be repeated to achieve different directional drilling results.

Figure 7:
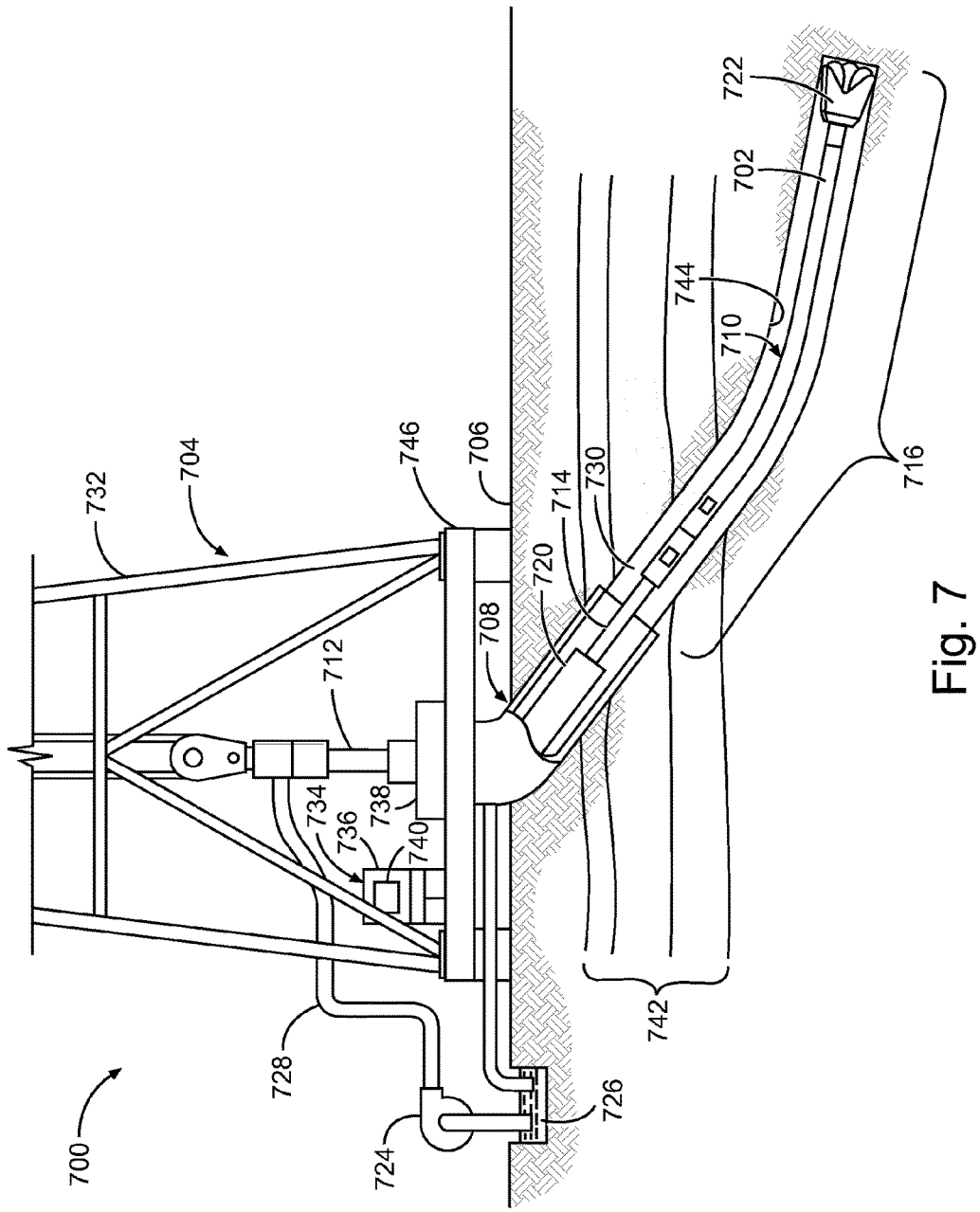
FIG. 7 depicts an example system at a drilling site, in accordance with some embodiments.

FIG. 7 depicts an example system 700 at a drilling site, in accordance with some embodiments. In the illustrated embodiment, the system 700 may form a portion of a drilling rig 704 located at the surface 706 of a well 708 at a drilling platform 746 equipped with a derrick 732. The drilling rig 704 may provide support for a drillstring 710. The drillstring 710 may operate to penetrate a rotary table 738 for drilling a borehole 744 through subsurface formations 742. The drillstring 710 may include a Kelly 712, drill pipe 714, and a bottom hole assembly 716, perhaps located at the lower portion of the drill pipe 714.

The bottom hole assembly 716 may include drill collars 720, a down hole tool 702, and a drill bit 722. In at least one embodiment, the down hole tool 702 comprises the directional drilling system 100 of FIGS. 1-6 to facilitate manipulating the direction of the drill bit 722. The drill bit 722 may operate to create the borehole 744 by penetrating the surface 706 and the subsurface formations 742. The down hole tool 702 may comprise any of a number of different types of tools including MWD tools, LWD tools, and others.

During drilling operations, the drillstring 710 (perhaps including the Kelly 712, the drill pipe 714, and the bottom hole assembly 716) may be rotated by the rotary table 738. Although not shown, in addition to, or alternatively, the bottom hole assembly 716 may also be rotated by a motor (e.g., a mud motor) that is located down hole. The drill collars 720 may be used to add weight to the drill bit 722. The drill collars 720 may also operate to stiffen the bottom hole assembly 716, allowing the bottom hole assembly 716 to transfer the added weight to the drill bit 722, and in turn, to assist the drill bit 722 in penetrating the surface 706 and subsurface formations 742.

During drilling operations, a mud pump 724 may pump drilling fluid (sometimes known by those of ordinary skill in the art as "drilling mud") from a mud pit 726 through a hose 728 into the drill pipe 714 and down to the drill bit 722. The drilling fluid can flow out from the drill bit 722 and be returned to the surface 706 through an annular area 730 between the drill pipe 714 and the sides of the borehole 744. The drilling fluid may then be returned to the mud pit 726, where such fluid is filtered. In some embodiments, the drilling fluid can be used to cool the drill bit 722, as well as to provide lubrication for the drill bit 722 during drilling operations. Additionally, the drilling fluid may be used to remove subsurface formation cuttings created by operating the drill bit 722.

Some embodiments include a surface logging facility 734 for processing, analysis, and/or storage of measurement or other data. The processing and analysis may include natural gamma-ray spectroscopy measurements and/or determination of formation density. The logging facility 734 may be provided with electronic equipment for various types of signal processing A workstation 736 and the controller 740 may include modules comprising hardware circuitry, a processor, and/or memory circuits that may store software program modules and objects, and/or firmware, and combinations thereof, as appropriate for particular implementations of various embodiments. For example, in some embodiments, such modules may be included in an apparatus and/or system operation simulation package, such as a software electrical signal simulation package, a power usage and distribution simulation package, a power/heat dissipation simulation package, and/or a combination of software and hardware used to simulate the operation of various potential embodiments.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims. Moreover, the particular embodiments disclosed above are illustrative only, as the disclosed subject matter may be modified and practiced in different but equivalent manners apparent to those skilled in the art having the benefit of the teachings herein. No limitations are intended to the details of construction or design herein shown, other than as described in the claims below. It is therefore evident that the particular embodiments disclosed above may be altered or modified and all such variations are considered within the scope of the disclosed subject matter. Accordingly, the protection sought herein is as set forth in the claims below.

What is claimed is:

1. An apparatus, comprising:
an eccentric coupler to be disposed around a driveshaft; and
a coil having a fixed end and a rotating end, wherein, responsive to a first transition temperature, the rotating end causes the eccentric coupler to rotate about the driveshaft, so as to move the driveshaft from a first orientation to a second orientation.

2. The apparatus of claim 1, further comprising a locking element to lock the driveshaft in the second orientation.

3. The apparatus of claim 2, wherein the locking element is actuated by at least one of: a bit load application, a drill string rotation, or a mud pressure differential.

4. The apparatus of claim 1, wherein the coil comprises shape memory alloy wire.

5. The apparatus of claim 1, wherein, responsive to a second transition temperature, the rotating end is to cause the eccentric coupler to rotate about the driveshaft, so as to return the driveshaft to the first orientation, from the second orientation.

6. The apparatus of claim 1, wherein the eccentric coupler comprises a slot to receive the rotating end.

7. The apparatus of claim 1, further comprising a torsion spring, wherein, responsive to a reduction in the first transition temperature, the torsion spring is to urge the driveshaft to return to the first orientation, from the second orientation.

8. The apparatus of claim 1, wherein the coil comprises shape memory alloy wire comprising a plurality of zones.

9. The apparatus of claim 8, wherein each of the plurality of zones responds to a different one of a plurality of transition temperatures, such that each of the plurality of transition temperatures corresponds to one of a plurality of orientations of the driveshaft.

10. A system, comprising:
a driveshaft to couple to a drill string or a drill bit; and
an apparatus, comprising:
an eccentric coupler disposed at the driveshaft; and
a coil coupled at one end to the eccentric coupler and comprising a fixed end and a rotating end, wherein, responsive to a first transition temperature, the rotating end is to cause the eccentric coupler to rotate about the driveshaft, so as to move the driveshaft from a first orientation to a second orientation, and wherein, responsive to a second transition temperature, the rotating end is to cause the eccentric coupler to rotate about the driveshaft, so as to return the driveshaft to the first orientation, from the second orientation, and wherein the coil comprises shape memory alloy wire.

11. The system of claim 10, further comprising electronics, wherein the electronics are to apply a current to heat the coil to the first transition temperature, so as to elongate wire forming the coil when the current is applied to the coil.

12. The system of claim 10, further comprising a cooling element, wherein the cooling element is to contract wire forming the coil when cooling is applied to the coil.

13. A method, comprising:
applying an electrical current to a coil having a fixed end and a rotating end,
in response to heating of the coil caused by the electrical current, rotating an eccentric coupler attached to the coil about a driveshaft, so as to move the driveshaft from a first orientation to a second orientation.

14. The method of claim 13, further comprising moving the driveshaft from the first orientation to the second orientation when the coil is heated to a first selected transition temperature.

15. The method of claim 14, further comprising moving the driveshaft from the second orientation to the first orientation when the coil is cooled to a second selected transition temperature.

16. The method of claim 14, wherein the first selected transition temperature is higher than an expected downhole operational temperature.

17. The method of claim 13, further comprising cooling the coil to cause the eccentric coupler to rotate about the driveshaft, so as to return the driveshaft to the first orientation, from the second orientation.

18. The method of claim 13, further comprising returning the driveshaft to the first orientation, from the second orientation, aided by a torsion spring coupled to the eccentric coupler.

19. The method of claim 13, further comprising locking, via a locking element, the driveshaft in the first or the second orientation.

* * * * *